US011809742B2

(12) United States Patent
Segev et al.

(10) Patent No.: US 11,809,742 B2
(45) Date of Patent: Nov. 7, 2023

(54) RECOVERY FROM HMB LOSS

(71) Applicant: Western Digital Technologies, Inc., San Jose, CA (US)

(72) Inventors: Amir Segev, Meiter (IL); Shay Benisty, Beer Sheva (IL)

(73) Assignee: Western Digital Technologies, Inc., San Jose, CA (US)

(*) Notice: Subject to any disclaimer, the term of this patent is extended or adjusted under 35 U.S.C. 154(b) by 38 days.

(21) Appl. No.: 17/479,795

(22) Filed: Sep. 20, 2021

(65) Prior Publication Data
US 2023/0100149 A1 Mar. 30, 2023

(51) Int. Cl.
G06F 3/06 (2006.01)
G06F 12/02 (2006.01)

(52) U.S. Cl.
CPC .......... *G06F 3/0656* (2013.01); *G06F 3/0619* (2013.01); *G06F 3/0659* (2013.01); *G06F 3/0679* (2013.01); *G06F 12/0292* (2013.01)

(58) Field of Classification Search
None
See application file for complete search history.

(56) References Cited

U.S. PATENT DOCUMENTS

| 10,157,004 | B2 | 12/2018 | Michaeli |
| 10,360,156 | B2 | 7/2019 | Yun et al. |
| 10,521,118 | B2* | 12/2019 | Benisty et al. ....... G06F 3/0688 |
| 2016/0026406 | A1 | 1/2016 | Hahn et al. |
| 2017/0351452 | A1 | 12/2017 | Boyd et al. |
| 2018/0039578 | A1 | 2/2018 | Yun et al. |
| 2018/0107417 | A1* | 4/2018 | Shechter et al. ..... G06F 3/0619 |
| 2019/0138220 | A1 | 5/2019 | Hahn et al. |
| 2020/0110677 | A1 | 4/2020 | Kim et al. |
| 2020/0151055 | A1 | 5/2020 | Eom et al. |
| 2021/0173786 | A1 | 6/2021 | Muthiah et al. |
| 2022/0107758 | A1* | 4/2022 | Benisty et al. ....... G06F 3/0679 |
| 2022/0164299 | A1* | 5/2022 | Moshe et al. .......... G06F 21/79 |
| 2022/0179593 | A1* | 6/2022 | Benisty .............. G06F 3/0604 |
| 2022/0229586 | A1* | 7/2022 | Benisty et al. ....... G06F 3/0679 |
| 2022/0253245 | A1* | 8/2022 | Seo .................... G06F 3/0653 |

OTHER PUBLICATIONS

International Search Report and Written Opinion for International Application No. PCT/US2022/028244 dated Oct. 25, 2022.

* cited by examiner

*Primary Examiner* — Charles Rones
*Assistant Examiner* — Ryan Dare
(74) *Attorney, Agent, or Firm* — PATTERSON + SHERIDAN, LLP; Steven H. VerSteeg

(57) ABSTRACT

A data storage device includes a memory device and a controller coupled to the memory device. The controller is configured to determine that a connection to a host memory buffer (HMB) of a host device is lost, load a most recent copy of a flash translation layer (FTL) table from the memory device, generate one or more updates to the most recent copy of the FTL table, and re-enable command fetching. The controller is further configured to mark one or more commands in a command database with an error condition upon the determining. After a boot of the connection, the controller is further configured to copy the FTL tables from the memory device to the HMB, work on commands, save FTL table differences between the HMB and the memory device, and update the FTL tables in the memory device.

20 Claims, 6 Drawing Sheets

RECOVERY FROM HMB LOSS

BACKGROUND OF THE DISCLOSURE

Field of the Disclosure

Embodiments of the present disclosure generally relate to data storage devices, such as solid state drives (SSDs), and, more specifically, recovering from a host memory buffer (HMB) loss.

Description of the Related Art

A portion of a dynamic random access memory (DRAM) of a host device may be utilized by a data storage device to store information that may be normally stored on the data storage device DRAM. The portion of the DRAM of the host device may be the host memory buffer (HMB). The HMB is provisioned by the host device to the data storage device, where the data storage device is able to access, write to, and read from the HMB without host device interaction. Thus, data storage devices may be manufactured with less DRAM or even no DRAM in order to decrease the cost of the data storage device.

However, the amount of control data that a controller of the data storage device needs to retain does not diminish. Thus, the control data may be stored on HMB or on a memory device of the data storage device. Accessing, retrieving data from, and writing data to the HMB may be faster than accessing, retrieving data from, and writing data to the memory device. However, because the data stored in the HMB is external to the data storage device, a viable copy of the data may be stored on the memory device in case of a power loss event, connection issues between the data storage device and the HMB, and the like. Additionally, because the HMB belongs to the host device, the host device may take back the area of the DRAM allocated for the HMB at any time. In such cases, the data storage device must be able to safely recover, without causing the host device to timeout.

Thus, there is a need in the art for recovery from HMB loss.

SUMMARY OF THE DISCLOSURE

The present disclosure generally relates to data storage devices, such as solid state drives (SSDs), and, more specifically, recovering from HMB loss. A data storage device includes a memory device and a controller coupled to the memory device. The controller is configured to determine that a connection to a host memory buffer (HMB) of a host device is lost, load a most recent copy of a flash translation layer (FTL) table from the memory device, generate one or more updates to the most recent copy of the FTL table, and re-enable command fetching. The controller is further configured to mark one or more commands in a command database with an error condition upon the determining. After a boot of the connection, the controller is further configured to copy the FTL tables from the memory device to the HMB, work on commands, save FTL table differences between the HMB and the memory device, and update the FTL tables in the memory device.

In one embodiment, a data storage device includes a memory device and a controller coupled to the memory device. The controller is configured to determine that a connection to a host memory buffer (HMB) of a host device is lost, load a most recent copy of a flash translation layer (FTL) table from the memory device, generate one or more updates to the most recent copy of the FTL table, and re-enable command fetching.

In another embodiment, a data storage device includes a memory device and a controller coupled to the memory device. The controller is configured to determine that a connection between the controller and a host memory buffer (HMB) of a host device has been restored, copy a flash translation layer (FTL) table from the memory device to the HMB, wherein the copying occurs after the connection between the controller and the HMB has been restored, and execute one or more commands stored in a command database.

In another embodiment, a data storage device includes memory means and a controller coupled to the memory means. The controller is configured to receive a command from a host device for a first time, send an error indication with a re-try suggestion for the command to the host device, receive the command from the host device for a second time, and execute the command. The controller is further configured to load a flash translation layer (FTL) table from the memory means between sending the error indication and executing the command.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, such as solid state drives (SSDs), and, more specifically, recovering from HMB loss. A data storage device includes a memory device and a controller coupled to the memory device. The controller is configured to determine that a connection to a host memory buffer (HMB) of a host device is lost, load a most recent copy of a flash translation layer (FTL) table from the memory device, generate one or more updates to the most recent copy of the FTL table, and re-enable command fetching. The controller is further configured to mark one or more commands in a command database with an error condition upon the determining. After a boot of the connection, the controller is further configured to copy the FTL tables from the memory device to the HMB, work on commands, save FTL table differences between the HMB and the memory device, and update the FTL tables in the memory device.

Figure 1:
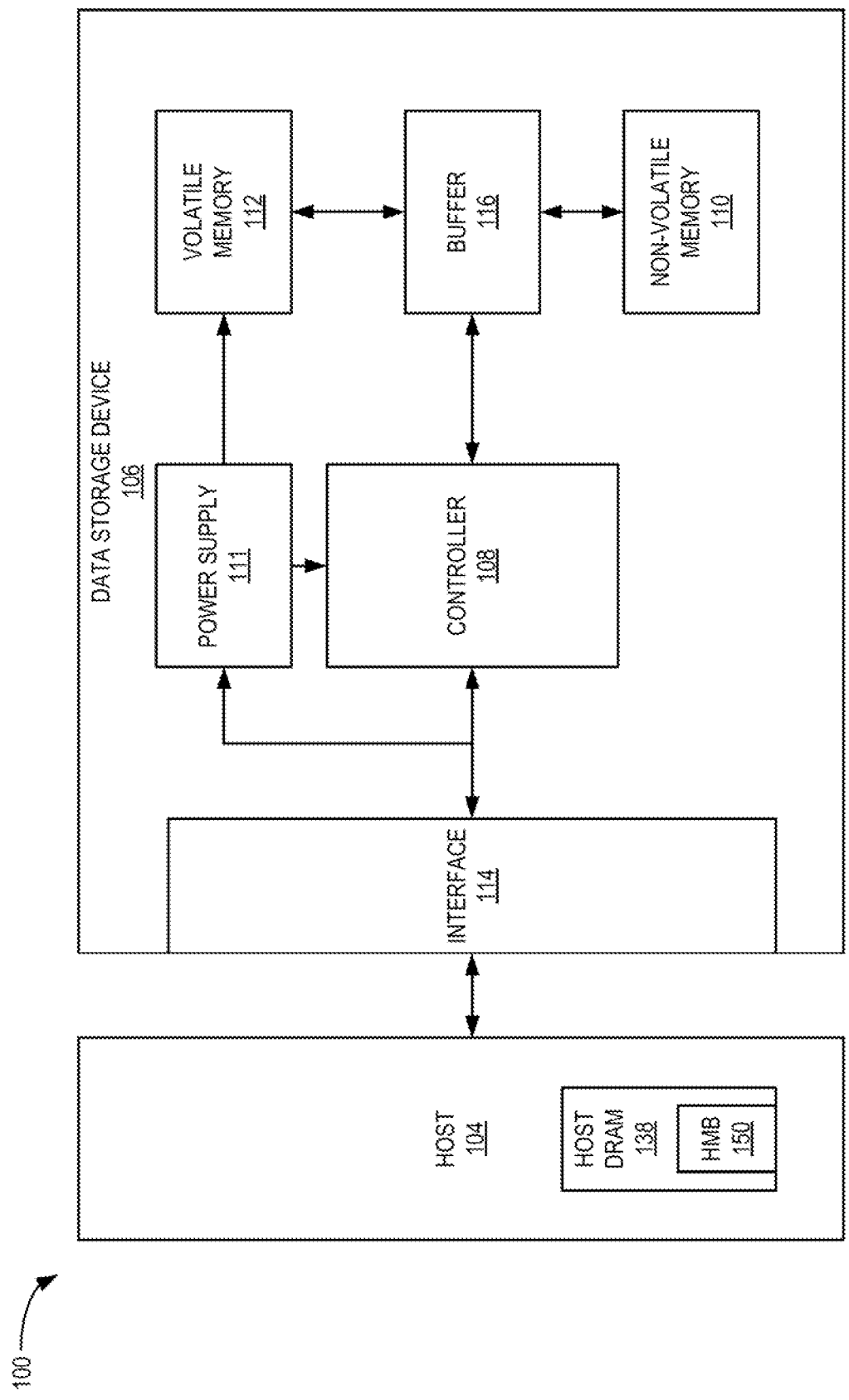
FIG. 1 is a schematic block diagram illustrating a storage system in which a data storage device may function as a storage device for a host device, according to certain embodiments.

FIG. 1 is a schematic block diagram illustrating a storage system 100 in which a host device 104 is in communication with a data storage device 106, according to certain embodiments. For instance, the host device 104 may utilize a non-volatile memory (NVM) 110 included in data storage device 106 to store and retrieve data. The host device 104 comprises a host DRAM 138 which includes a host memory buffer (HMB) 150. The HMB 150 is a section of the host DRAM 138 allocated for use by a controller 108 of the data storage device 106. The HMB 150 may store control information, metadata, parity data, error correction code, and other data that may be generally stored in the controller 108 memory or similar memory. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes the controller 108, NVM 110, a power supply 111, volatile memory 112, the interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

Figure 2A:
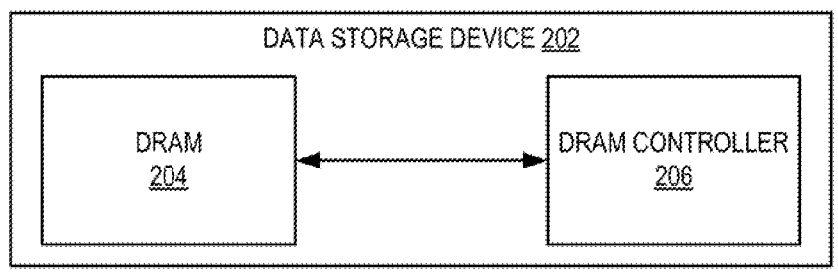
FIG. 2A is a schematic illustration of a data storage device showing DRAM ownership, according to certain embodiments.

FIG. 2A is a schematic illustration of a data storage device 202 showing DRAM ownership, according to certain embodiments. The data storage device 202 may be the data storage device 106 of FIG. 1. The data storage device 202 includes a DRAM 204, which may be the volatile memory 112 of FIG. 1, and a DRAM controller 206, which may be the controller 108 of FIG. 1. It is to be understood that the DRAM 204 may be any applicable volatile memory, such as SRAM. When the DRAM 204 experiences a fatal failure, such as a SECDED detected double error, the failure is DRAM controller 206 initiates a reset of the data storage device 202. Thus, the DRAM controller 206 has control of the DRAM 204.

Figure 2B:
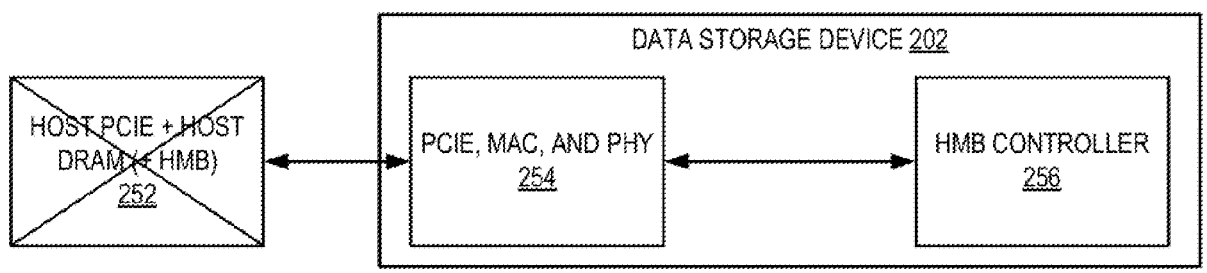
FIG. 2B is a schematic illustration of the data storage device of FIG. 2A showing HMB ownership, according to certain embodiments.

FIG. 2B is a schematic illustration of the data storage device 202 of FIG. 2A showing HMB ownership, according to certain embodiments. The data storage device includes a PCIE, MAC, and PHY module 254, which may be the interface 114 of FIG. 1, coupled to a HMB controller 256. The PCIE, MAC, and PHY module 254 is coupled to a host PCIE and host DRAM 252 of a host device, such as the host device 104 of FIG. 1, where the host DRAM includes an HMB. When working with the HMB of the host PCIE and host DRAM 252, the host device 104 may revoke the HMB controller 256 access to the HMB or connection between the HMB and the HMB controller 256 may be disrupted. When the connection is disrupted, the data storage device 202 must be able to safely recover without causing the host device 104 to experience a "blue screen" effect or a timeout scenario. The recovery may be completed in case of SECDED, authentication error, link issues, and other cases causing the DRAM data to be invalid. The "blue screen" effect or timeout scenario may be caused by not responding to the host device 104 at the PCIE level or by timing out commands at the NVMe level.

Figure 3:
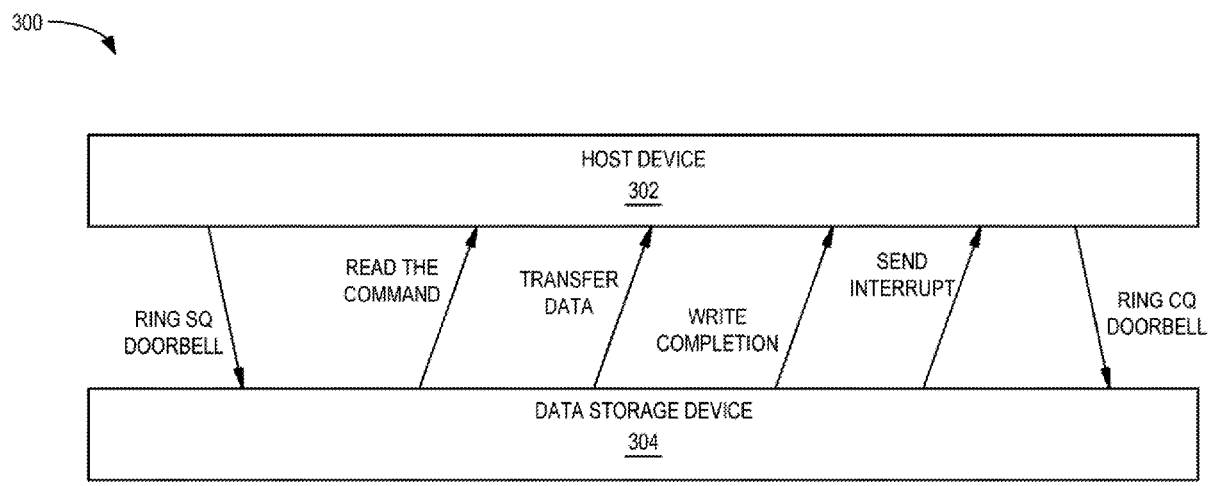
FIG. 3 is a schematic illustration of an NVMe command flow, according to certain embodiments.

FIG. 3 is a schematic illustration of an NVMe command flow 300, according to certain embodiments. The NVMe command flow 300 includes a host device 302, which may be the host device 104 of FIG. 1, and a data storage device 304, which may be the data storage device 106 of FIG. 1. When the host device 302 generates a read command or a write command, the read command or the write command is stored in a submission queue of the host device 302. The submission queue may be implemented in a host DRAM, such as the host DRAM 138 of FIG. 1. The host device 302 rings a submission queue doorbell of the data storage device 304, which indicates to the data storage device 304, or more specifically, a controller, such as the controller 108, of the data storage device 304 that the submission queue has a command queued.

The data storage device 304 responds by reading the command from the submission queue of the host device 302. In one example, the command is a read command, such that the relevant data is read from a memory device, such as the NVM 110 of FIG. 1, of the data storage device 304 and transferred back to the host device 302. After completing the read command, the controller 108 of the data storage device 304 generates a completion message for the completed command and writes the completion message to a completion queue of the host device 302, which may be in the host DRAM 138. The data storage 304 also sends an interrupt message to the host device 302. The host device 302 is signified that the command has been completed after receiving both the completion message and the interrupt message. The host device 302 acknowledges the completion of the command by ringing a command completion queue doorbell of the data storage device 304.

Figure 4:
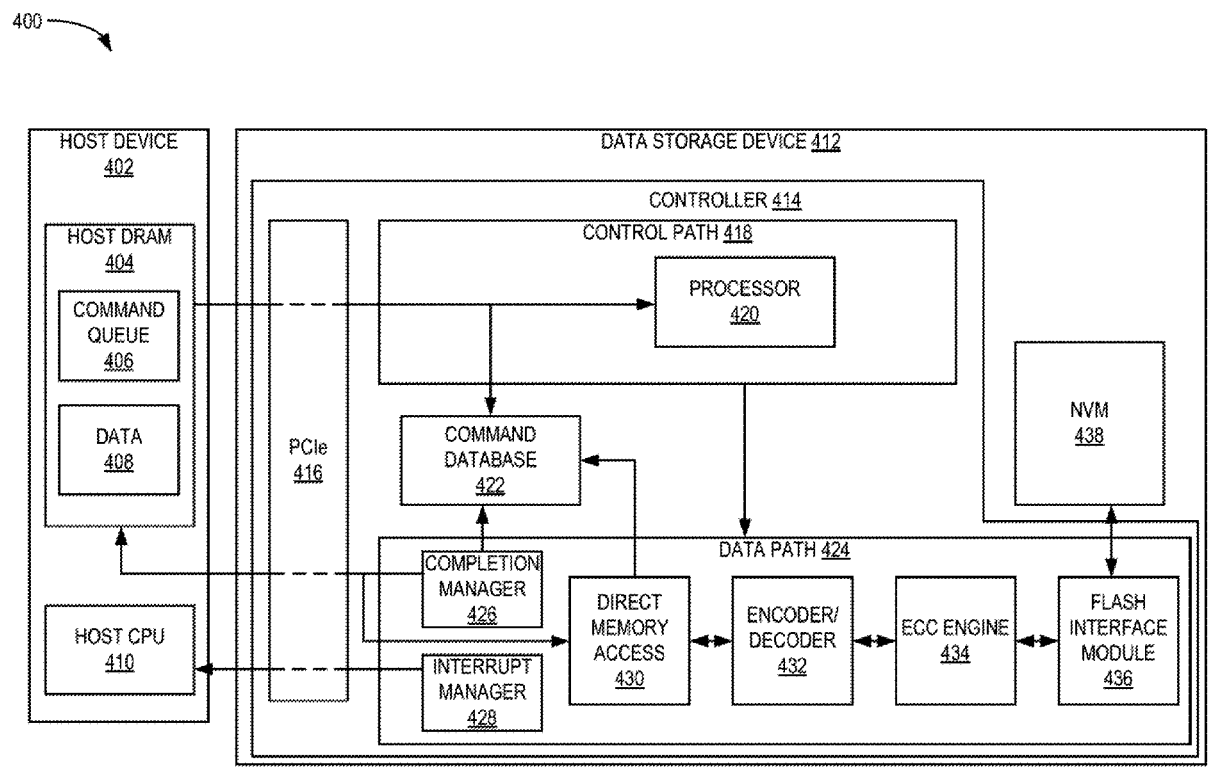
FIG. 4 is a schematic block diagram illustrating a storage system in which a data storage device may function as a storage device for a host device, according to certain embodiments.

FIG. 4 is a schematic block diagram illustrating a storage system 400 in which a data storage device 412 may function as a storage device for a host device 402, according to certain embodiments. Aspects of the storage system 400 may be similar to the storage system 100 of FIG. 1. It is to be understood that the storage system 400 may include additional components and flows not illustrated for simplification purposes. The host device 402 includes a host DRAM 404 and a host central processing unit (CPU) 410. The host DRAM 404 includes a command queue 406, which may include a submission queue and a completion queue, and data 408. The host CPU 410 is configured to at least process received interrupt messages from an interrupt manager 428, which may be an interrupt state machine, of the data storage device 412. The command queue 406 stores commands to be fetched by a controller 414 of the data storage device 412 as well as completion messages sent by a completion manager 426, which may be a completion state machine, of the controller 414.

The data storage device 412 includes the controller 414 and an NVM 438, which may be the NVM 110 of FIG. 1. The controller 414 includes a PCIe protocol interface 416, a control path 418, a command database 422, and a data path 424. The PCIe protocol interface 416 is configured to fetch data and commands from the host DRAM 404 as well as send data, completion messages, and interrupt messages to the host device 402. When the PCIe protocol interface 416 fetches a command from the command queue 406, the command is sent to the control path 418, where the command is received at a processor 420. Concurrently, the command passed to the command database 422. After the processor 420 processes and analyzes the command, the control path 418 generates a request to the data path 424 for the execution of the command.

Data of the command is transferred from the data 408 to the PCIe protocol interface 416, where the PCIe interface 416 passes the data to a direct memory access (DMA) 430. The DMA 430 may be configured to access the NVM 438 indirectly through an encoder/decoder 432, an error correction code (ECC) engine 434, and a flash interface module (FIM) 436 or an internal memory of the controller 414, such as DRAM. The data is passed to the encoder/decoder 432, which, in other implementations, may be separate components.

The encoder/decoder 432 may include logic to protect data from errors or include logic to correct errors in the data when reading the data from the NVM 438. For example, the encoder of the encoder/decoder 432 encodes data to be stored to the NVM 438 and the decoder of the encoder/decoder 432 decodes data retrieved from the NVM 438. Encoding data may include data shaping as well as data encryption. The encoded data is passed from the encoder/decoder 432 to the ECC engine 434. The ECC engine 434 programs ECC data to the encoded data, such that when the data is read from the NVM, errors may be corrected using the ECC data. In some embodiments, the data path 424 also includes a low-density parity check (LDPC) engine and/or an XOR parity engine. The data is then passed to the FIM 436, which schedules and programs the data to the NVM 438.

When a read command is executed, the FIM 436 retrieves the relevant data from the NVM 438 and the ECC engine 434 corrects any errors, within its capabilities, prior to passing the data to the decoder of the encoder/decoder 432 to be decoded/decrypted. The data is then passed to the DMA and send through the PCIe protocol interface 416 to the host DRAM 404. When the data is passed to the host DRAM, the completion manager 426 generates a completion message and sends the completion message to a completion queue of the command queue 406. Likewise, the interrupt manager 428 generates an interrupt message and the interrupt message is sent to the host CPU 410 to notify the host CPU 410 that a completion message has been posted to the command queue.

If there are no errors during the data read in the data path 424, then the read command in the command database 422 is updated with a successful data transfer indicator. However, if there is an error during the data read in the data path 424, then the read command in the command database 422 is updated with a data transferred with error indicator.

Figure 5:
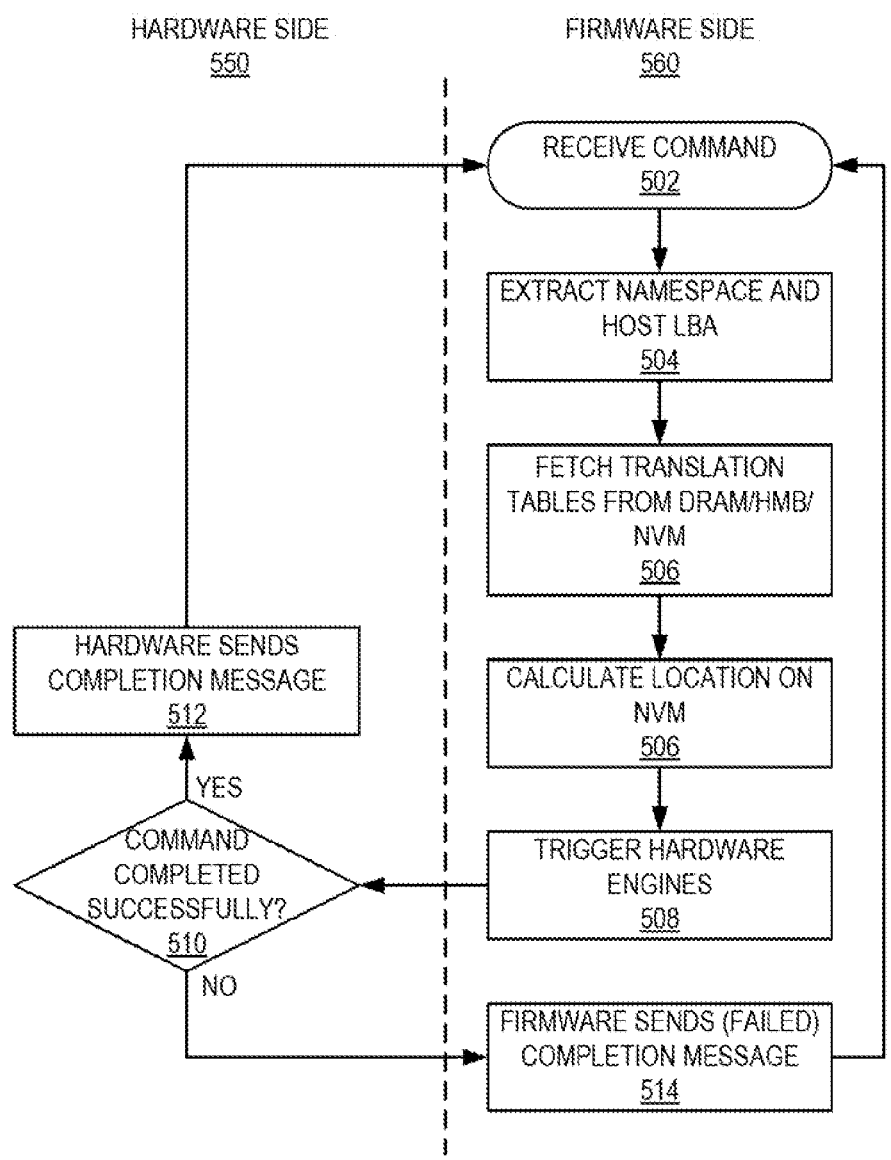
FIG. 5 is a flow diagram illustrating a method of executing a command from a hardware side and a firmware side, according to certain embodiments.

FIG. 5 is a flow diagram illustrating a method 500 of executing a command from a hardware side 550 and a firmware side 560, according to certain embodiments. Method 500 may be implemented by the controller 414 of FIG. 4. Thus, for exemplary purposes, aspects of the storage system 400 may be referenced in the description herein.

At block 502, the controller 414 receives a command from the host device 402. The command may be fetched from the command queue 406, or more specifically, a submission queue of the command queue 406. At block 504, the processor 420 extracts a namespace and a host logical block address (LBA) associated with the fetched command. At block 506, the controller 414 fetches the translation tables (e.g., the flash translation layer (FTL) tables) stored in either the DRAM, the HMB, or the NVM 438. In some examples, because access time of the NVM 438 may be too big to meet performance requirements, the translation tables may be stored in DRAM or HMB instead. Thus, the controller 414 may fetch the relevant translation tables from DRAM or HMB, where the relevant parts of the translation tables are cached. At block 506, the processor 420 calculates the relevant location associated with the fetched command on the NVM 438 using the fetched translation tables. At block 508, the firmware side 560 triggers the hardware engines of the hardware side 550.

At block 510, the controller 414 determines if the command has completed successfully. If the command has completed successfully at block 510, then the hardware, such as the completion manager 426, sends a completion message back to the host device 402 at block 512. However, if the command has not completed successfully at block 510, then the firmware sends a failed completion message to the host device. The failed completion message may include error information associated with the failed command. The firmware (e.g., the processor 420) may be responsible for triggering the hardware engines (e.g., the data path 424).

Figure 6A:
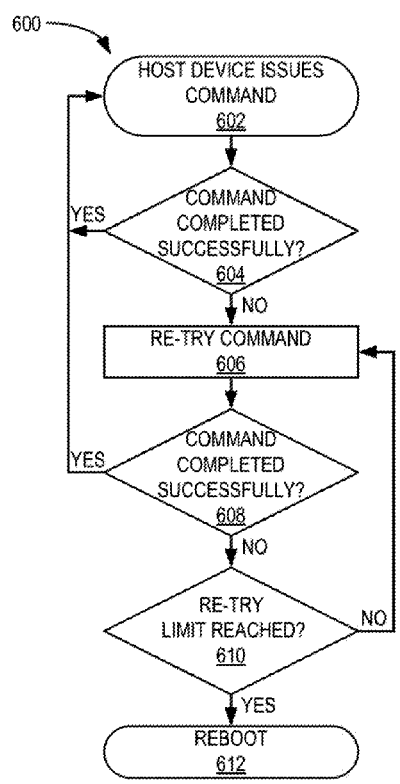
FIG. 6A is a flow diagram illustrating a method of host command issuing, according to certain embodiments.

FIG. 6A is a flow diagram illustrating a method 600 of host command issuing by a host device, such as the host device 402 of FIG. 4, according to certain embodiments. Method 600 may be implemented by the controller 414 of FIG. 4. Thus, for exemplary purposes, aspects of the storage system 400 may be referenced in the description herein.

At block 602, the host device 402 issues a command. The command may be stored in a submission queue, where the host device 402 sends a doorbell to the data storage device 412 in order to notify the data storage device 412 that the submission queue has a queued command to be fetched. At block 604, the host device 402 determines if the command has completed successfully. For example, the completion manager 426 of the controller 414 may issue a completion message with a successful completion indicator or a completion with error indicator to the host device 402 in response to executing the fetched command. If the command has not completed successfully, the host device 402 re-tries the command at block 606 by resending (e.g., issuing another doorbell) the command. At block 608, the host device 402 determines if the re-tried command has been completed successfully.

If the command has been completed successfully at either block 604 or block 608, method 600 returns to block 602. However, if the command has not been successfully completed at block 608, then at block 610, the host device 402 determines if a re-try limit for the command has been reached. For example, the re-try limit may be 1 re-try. It is to be understood that the re-try limit may be any positive integer optimized or adjusted for system performance. In some examples, the controller 414 may receive an indication, due to the host device 402 reaching the re-try limit, to prepare for a reboot (e.g., a reboot command issued by the host device 402) of the connection.

If the re-try limit has not been reached at block 610, then the host device 402 re-tries the command at block 606. However, if the re-try limit has been reached at block 610, then the connection between the data storage device 412 and the host device 402 is rebooted. In some examples, the host device 402 may determine to reboot the data storage device 412. When the connection is rebooted, the HMB may be temporarily inaccessible by the controller 414. Thus, any FTL tables stored in an HMB, such as the HMB 150 of FIG. 1, as well as other information may be inaccessible until the connection is re-established.

Figure 6B:
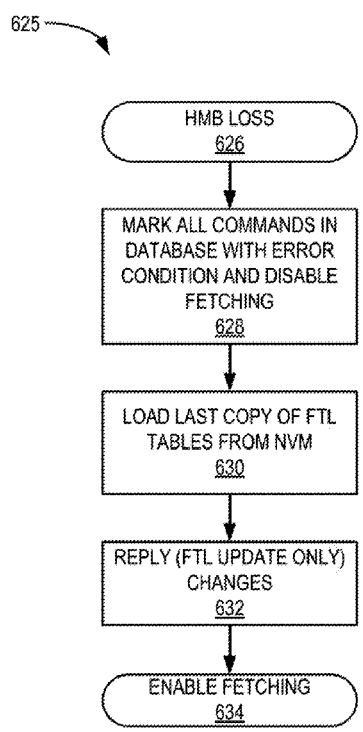
FIG. 6B is a flow diagram illustrating a method of handling a HMB loss by a data storage device, according to certain embodiments.

FIG. 6B is a flow diagram illustrating a method 625 of handling a HMB loss by a data storage device, such as the data storage device 412 of FIG. 4, according to certain embodiments. Method 625 may be implemented by the controller 414 of FIG. 4. Thus, for exemplary purposes, aspects of the storage system 400 may be referenced in the description herein.

At block 626, the controller 414 determines that there has been an HMB 150 loss. For example, the HMB 150 loss may be the reboot at block 612 of FIG. 6A or any other applicable HMB 150 connection loss, such as a connection reset or noise in the connection channel. At block 628, the controller 414 marks all commands that are in the command database 422 that have not been successfully executed or that does not have a successful completion indicator with an error condition (e.g., an error indicator). At block 628, the controller 414 also disables fetching of commands from the host device 402 upon determining that the connection to the HMB 150 has been lost. At block 630, the last copy of the FTL tables (i.e., translation tables) are loaded from the NVM 438. It is contemplated that the last copy of the FTL tables loaded from the NVM 438 may not be the same as the FTL tables stored in the HMB 150.

At block 632, the controller 414 re-creates the most-to-date FTL table using the loaded FTL table and the commands in the command database 422. The one or more updates to the FTL table generated may be stored in the NVM 438 and transferred to the HMB 150 when the HMB 150 connection is restored. At block 634, the command fetching is re-enabled, such that one or more commands may be fetched or re-fetched from the host device 402. The host device 402 may re-try the failed commands (e.g., the commands marked with the error condition) by causing the controller 414 to fetch the failed commands from the host device 402 in order to get a successful completion of the failed commands.

Figure 6C:
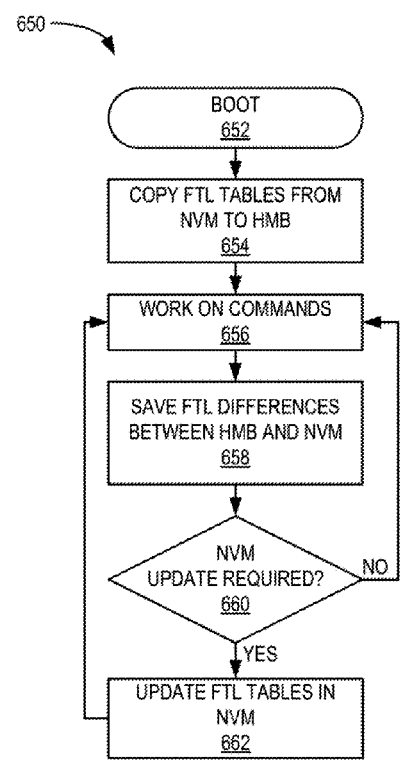
FIG. 6C is a flow diagram illustrating a method of post-boot handling by a data storage device, according to certain embodiments.

FIG. 6C is a flow diagram illustrating a method 650 of post-boot handling by a data storage device, such as the data storage device 412 of FIG. 4, according to certain embodiments. Method 650 may be implemented by the controller 414 of FIG. 4. Thus, for exemplary purposes, aspects of the storage system 400 may be referenced in the description herein.

At block 652, the connection to the HMB 150 is booted. At block 654, the FTL tables are copied from the NVM 438 to the HMB 150. The copying may comprise of copying the entire FTL tables from the NVM 438 to the HMB 150 or only the updated portions of the FTL table from the NVM 438 to the HMB 150. For example, the updated portions may be the differences between the FTL table located in the NVM 438 and FTL table located in the HMB 150. Furthermore, during data storage device 412 operation, updates to the FTL tables may be stored in a history buffer of a local SRAM or any other applicable buffer, such as DRAM, of the data storage device 412.

For example, at block 656, as the controller 414 works on queued or fetched commands, FTL table updates are generated. At block 658, the FTL table updates (i.e., the differences between the HMB 150 and the NVM 438) are stored in the SRAM or any other applicable buffer as well as the HMB 150. In some examples, the buffer may be DRAM. Because accessing the HMB 150 may be generally faster than accessing the NVM 438, the FTL updates are stored in both the SRAM as well as the HMB 150. Thus, the HMB 150 may have a more up-to-date version of the FTL tables when compared to the NVM 438.

At block 660, the controller 414 determines if the NVM 438 requires an update to update the stored FTL tables in the NVM 438 to match the FTL tables stored in the HMB 150. For example, the controller 414 may determine that the NVM 438 needs to be updated due to a force unit access (FUA) command, the history buffer getting full, a periodic update due to number of transactions or time elapsed, an idling of the NVM 438, which may be caused by a lack of commands to be executed, or the history buffer being purged. If there is not a NVM 438 update required at block 660, then method 650 returns to block 656. However, if there is a NVM 438 update required at block 660, then the controller 414 updates the FTL tables in the NVM 438 to match the FTL tables stored in the HMB 150 at block 662. In one example, the update may copy the updated portions from the FTL tables stored in either the HMB 150 or the SRAM to the FTL tables of the NVM 438. In another example, the differences between the FTL tables of the HMB 150 and FTL tables of the NVM 438 may be determined and the FTL tables of the NVM 438 may be updated based on the determined differences.

By completing commands with an error condition in order to cause a host device to re-try the command, a recovery from a HMB loss may be performed without causing the host device to timeout.

In one embodiment, a data storage device includes a memory device and a controller coupled to the memory device. The controller is configured to determine that a connection to a host memory buffer (HMB) of a host device is lost, load a most recent copy of a flash translation layer (FTL) table from the memory device, generate one or more updates to the most recent copy of the FTL table, and re-enable command fetching.

The controller is further configured to disable the command fetching upon determining that the connection to the HMB of the host device is lost. Re-enabling the fetching comprises fetching one or more commands from the host device. The memory device is a non-volatile memory device. The controller is configured to store the FTL table in both HMB and the memory device. The generated one or more updates are stored in the memory device. The controller is configured to update a FTL table stored in the HMB with the generated one or more updates stored in the memory device upon restoration of the connection to the HMB. The controller is further configured to mark one or more commands in a command database with an error condition upon the determining. The error condition suggests to the host device to re-try sending the marked one or more commands to the controller to be executed. The controller is further configured to execute the marked one or more commands after the re-enabling and receiving the marked one or more commands from the host device.

In another embodiment, a data storage device includes a memory device and a controller coupled to the memory device. The controller is configured to determine that a connection between the controller and a host memory buffer (HMB) of a host device has been restored, copy a flash translation layer (FTL) table from the memory device to the HMB, wherein the copying occurs after the connection between the controller and the HMB has been restored, and execute one or more commands stored in a command database.

The one or more commands includes one or more marked commands. The one or more marked commands comprises commands that are marked with an error condition due to the HMB loss. The controller is further configured to update the FTL table stored in the HMB with the executed one or more commands. The controller is further configured to determine that the FTL table stored in the memory device is different than the FTL table stored in the HMB. The controller is further configured to update the FTL table stored in the memory device with the FTL table stored in the HMB upon the determining that the FTL table stored in the memory device is different than the FTL table stored in the HMB. The controller is further configured to determine that the FTL table stored in the HMB is different than the FTL table stored in the memory device. The copying comprises updating the FTL table stored in the HMB with changes from the FTL table stored in the memory device upon determining that the FTL table stored in the HMB is different than the FTL table stored in the memory device.

In another embodiment, a data storage device includes memory means and a controller coupled to the memory means. The controller is configured to receive a command from a host device for a first time, send an error indication with a re-try suggestion for the command to the host device, receive the command from the host device for a second time, and execute the command. The controller is further configured to load a flash translation layer (FTL) table from the memory means between sending the error indication and executing the command.

The controller is further configured to determine that a connection to a host memory buffer (HMB) has been lost. The controller is further configured to receive an indication for a reboot operation from the host device due to a re-try limit being reached. The controller is further configured to receive a reboot command from the host device due to the indication for the reboot operation.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device; and
a controller coupled to the memory device, the controller configured to:
determine that a connection to a host memory buffer (HMB) of a host device is lost, wherein the connection between the host device and the data storage device is rebooted, wherein the rebooting occurs responsive to a re-try limit of a command being reached, wherein re-trying the command comprises resending the command to the data storage device from the host device responsive to a re-try suggestion sent by the controller to the host device, wherein the HMB stores an updated copy of a flash translation layer (FTL) table;
load a most recent copy of a FTL table from the memory device to the controller, wherein the most recent copy of the FTL table is a previous version of the updated copy of the FTL table;
generate one or more updates to the most recent copy of the FTL table; and
re-enable command fetching.

2. The data storage device of claim 1, wherein the controller is further configured to disable the command fetching upon determining that the connection to the HMB of the host device is lost.

3. The data storage device of claim 1, wherein re-enabling the fetching comprises fetching one or more commands from the host device.

4. The data storage device of claim 1, wherein the memory device is a non-volatile memory device.

5. The data storage device of claim 1, wherein the controller is configured to store the FTL table in both HMB and the memory device.

6. The data storage device of claim 1, wherein the generated one or more updates are stored in the memory device.

7. The data storage device of claim 6, wherein the controller is configured to update a FTL table stored in the HMB with the generated one or more updates stored in the memory device upon restoration of the connection to the HMB.

8. The data storage device of claim 1, wherein the controller is further configured to mark one or more commands in a command database with an error condition upon the determining.

9. The data storage device of claim 8, wherein the error condition suggests to the host device to re-try sending the marked one or more commands to the controller to be executed, and wherein the controller is further configured to execute the marked one or more commands after the re-enabling and receiving the marked one or more commands from the host device.

10. A data storage device, comprising:
a memory device; and
a controller coupled to the memory device, the controller configured to:
determine that a connection between the controller and a host memory buffer (HMB) of a host device has been restored, wherein the connection between the host device and the data storage device is rebooted, and wherein the rebooting occurs responsive to a re-try limit of a command being reached, wherein re-trying the command comprises resending the command to the data storage device from the host device responsive to a re-try suggestion sent by the controller to the host device;

copy a first flash translation layer (FTL) table from the memory device to the HMB, wherein the copying occurs responsive to determining that the connection between the controller and the HMB has been restored, wherein the HMB stores a second FTL table, and wherein the first FTL table and the second FTL table are different versions; and execute one or more commands stored in a command database.

11. The data storage device of claim 10, wherein the one or more commands includes one or more marked commands, and wherein the one or more marked commands comprises commands that are marked with an error condition due to an HMB loss.

12. The data storage device of claim 11, wherein the controller is further configured to update the second FTL table stored in the HMB with the executed one or more commands.

13. The data storage device of claim 12, wherein the controller is further configured to determine that the first FTL table stored in the memory device is different than the second FTL table stored in the HMB.

14. The data storage device of claim 13, wherein the controller is further configured to update the first FTL table stored in the memory device with the second FTL table stored in the HMB upon the determining that the first FTL table stored in the memory device is different than the second FTL table stored in the HMB.

15. The data storage device of claim 10, wherein the controller is further configured to determine that the second FTL table stored in the HMB is different than the first FTL table stored in the memory device.

16. The data storage device of claim 15, wherein the copying comprises updating the second FTL table stored in the HMB with changes from the first FTL table stored in the memory device upon determining that the second FTL table stored in the HMB is different than the first FTL table stored in the memory device.

17. A data storage device, comprising:

memory means; and a controller coupled to the memory means, the controller configured to:

receive a command from a host device for a first time;

send an error indication with a re-try suggestion for the command to the host device, wherein a connection between the host device and the data storage device is rebooted responsive to a re-try limit of a command being reached;

receive, after the connection is rebooted, the command from the host device for a second time in response to the sending the re-try suggestion; and execute the command in response to receiving the command from the host device for the second time, wherein between sending the error indication and executing the command, the controller is configured to load a flash translation layer (FTL) table from the memory means.

18. The data storage device of claim 17, wherein the controller is further configured to determine that a connection to a host memory buffer (HMB) has been lost.

19. The data storage device of claim 17, wherein the controller is further configured to receive an indication for a reboot operation from the host device due to the re-try limit being reached.

20. The data storage device of claim 19, wherein the controller is further configured to receive a reboot command from the host device due to the indication for the reboot operation.

* * * * *